F. GREINER.
SPRING SUSPENSION FOR AUTOMOBILES AND THE LIKE.
APPLICATION FILED FEB. 28, 1914.
1,101,432.  Patented June 23, 1914.
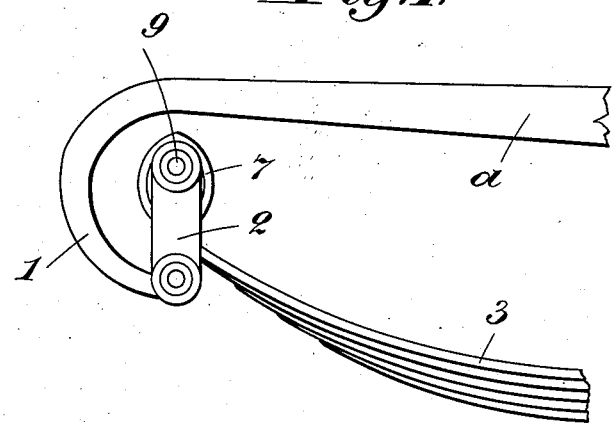
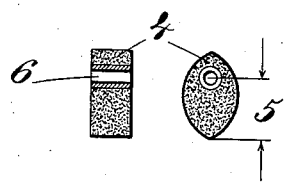

UNITED STATES PATENT OFFICE.

FRIEDRICH GREINER, OF SCHWÄBISCH-GMÜND, NEAR STUTTGART, GERMANY, ASSIGNOR TO OTTO SCHLICK, OF BERLIN, GERMANY.

SPRING SUSPENSION FOR AUTOMOBILES AND THE LIKE.

1,101,432.	Specification of Letters Patent.	Patented June 23, 1914.

Application filed February 28, 1914. Serial No. 821,732.

*To all whom it may concern:*

Be it known that I, FRIEDRICH GREINER, of Schwäbisch-Gmünd, a subject of the King of Wurttemberg, and whose post-office address is 8 Bergstrasse, Schwäbisch-Gmünd, near Stuttgart, Kingdom of Wurttemberg, German Empire, have invented a new and useful Spring Suspension for Automobiles and the like, of which the following is a specification.

This invention relates to a spring suspension for automobiles and the like, in which an elastic bolster, for instance a rubber buffer is provided between the end of the flat spring and the arm of the frame or the spring carrier of the body. In order to fit all leaf spring ends or carriers in a simple and cheap manner with sound and shock absorbers which require little room, an elastic bolster, in particular a rubber buffer is fitted according to the present invention in form of a bearing block eccentrically containing the spring bolt in a metallic bushing directly into the end of the spring bent into the shape of a correspondingly enlarged non-round eye.

In Figure 1 a constructional form of a spring suspension on the chassis beam *a* is exemplified, the carrier end 1 for the spring and the enlarged bearing eye 7 of the leaf spring 3 being coupled by means of a hanging link member 2. Fig. 2 illustrates a leaf spring with the enlarged bearing eye 7, in which the rubber block 4 is fitted. The cross section 4, Fig. 3, illustrates a section across the rubber block, which is fitted into the eye 7.

Through the rubber block, Fig. 3, which is of an oval or otherwise non-round shape, in order to prevent its turning in its eye 7, is passed a metallic bushing 6, in which the spring bolt 9 is journaled. The eccentricity of the metallic bushing 6 has the object of affording a high rubber buffer, as indicated at 5 between the arrow points, on which buffer the weight of the car rests. This rubber block is so arranged, that the larger mass of bearing rubber can be turned up or down for receiving the weight of the car, so that the rubber blocks can always receive the bearing pressure or the hanging pressure at their thickest part. By the non-round shape it is rendered impossible for the rubber block to turn in the eye 7. The hanging link members 2 at the sides will prevent the rubber block from leaving the eye sidewise. By this spring suspension with aid of the rubber block at all bearing points the person riding in the car will notice the shocks and the noise caused by the travel of the car still less than heretofore, as all resonance is avoided and the spring suspension is soft and sweet. Also when an automobile or the like starts the jerk will not be felt as violent as hitherto when the engine was engaged.

What I do claim as my invention, and desire to secure by Letters Patent of the United States, is:—

1. In a spring suspension for automobiles and the like the combination of a leaf spring each end of which being formed into a non-round enlarged bearing eye, an elastic block fitting into the said eye, a bushing adapted to serve as journal for the spring bolt and arranged eccentrically within the said elastic block and means for connecting the said block movably with the spring carrier, substantially as set forth.

2. In a spring suspension for automobiles and the like the combination of a leaf spring each end of which being formed into a non-round enlarged bearing eye, an elastic block fitting into the said eye, a bushing adapted to serve as journal for the spring bolt and arranged eccentrically within the said elastic block and a hanging link member for connecting the said block with the spring carrier, substantially as set forth.

In testimony whereof I have hereunto set my hand in presence of two subscribing witnesses.

FRIEDRICH GREINER.

Witnesses:
ERNEST ENTENMANN,
ROSA THALBAUERZ.